Patented Oct. 19, 1943

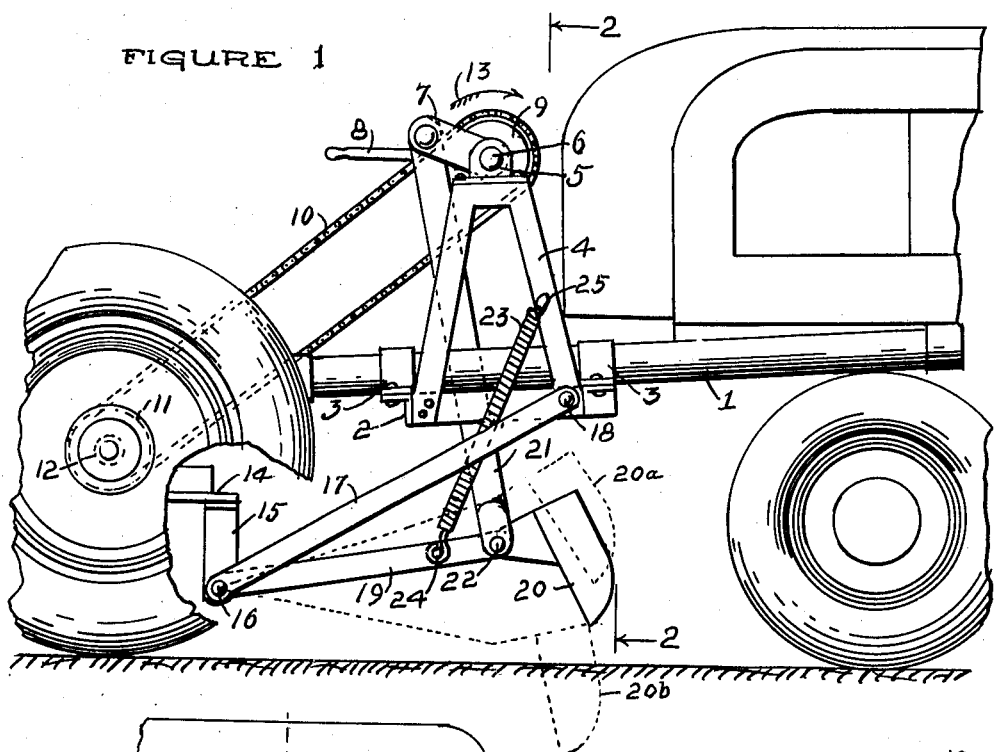

2,332,262

UNITED STATES PATENT OFFICE 2,332,262

HOLE DIGGING MACHINE

Philip H. Rowe, near Watsonville, Calif.

Application June 24, 1941, Serial No. 399,555

1 Claim. (Cl. 97—45)

The present invention relates to a machine for digging shallow holes in the ground and mountable upon, and operable by, a tractor.

While the device may be adapted for use in connection with any form of power driven vehicle, and applied to many different purposes, for the purpose of this disclosure one specific form of tractor is referred to, and the device is described as applied to the formation of holes preparatory to the planting of tomato plants.

In the planting of young tomato plants on a large scale, that is in the setting out large fields of the plants as when the tomatoes are grown for canning and shipping rather than for local consumption, it has heretofore been customary to effect the planting in the same manner as in the planting of a few plants. That is, the holes were dug by hand, and each following operation was performed manually.

But the digging of acres of holes, even though they may be small and shallow, is a time-consuming and laborious undertaking regardless of the purpose for which they are made. When made for the purpose indicated, the time consumed in preparing to plant the young plants results in the loss of a material number of them.

It is, therefore, one object of my invention to provide means whereby the type of holes referred to may be quickly and easily formed in any desired number and spaced as desired.

It is also an object of the invention to provide means of the character indicated that may be readily adapted for use in connection with a tractor or other suitable power operated vehicle.

It is a further object of the invention to provide means of the character indicated that will be economical to manufacture, simple in form and construction, positive in action, strong, durable, and highly efficient in its practical application.

In the drawing:

Figure 1 is a side elevation of a portion of a tractor with a device embodying my invention mounted thereon.

Figure 2 is a sectional view showing the parts lying immediately in front of the plane indicated by the line 2—2 in Figure 1.

Figure 3 is a plan view of a portion of a tractor and showing how a part of my improved hole digger is mounted thereon.

Referring now more particularly to the specific embodiment of the invention disclosed, the reference character 1 indicates a tractor of the wheeled type, and 2 indicates a supporting structure mounted thereon, transversely thereof, and substantially midway its length. This supporting structure is held fixedly in position by means of clamps 3 and includes upstanding standards 4.

On the standards 4 is journaled, as at 5, a crank shaft 6 in which the crank is shown at 7. In the crank shaft 6 is inserted a clutch of any suitable type as indicated at 8. On one end of the crank shaft 6 is mounted a sprocket wheel 9 which is connected to, and driven by, a chain 10 engaging a sprocket 11 on the drive shaft 12 of the tractor. While one portion of shaft 6 is being rotated continuously in the direction indicated by arrow 13 when the tractor is in motion, the other portion including the crank 7 may be caused to rotate or not at the will of the operator.

Mounted on the rear axle housing of the tractor is a brace member 14, this member extending forwardly of the housing and having a depending bracket 15 mounted thereon, the pin 16 in the lower end of said bracket thereby being brought down to a point adjacent the ground over which the tractor travels. This bracket 15 is braced and rigidly held in place by means of tie-bars 17 extending from the pin 16 to the lower forward corners of two of the standards 4 to which they are secured as at 18.

Pivotally mounted upon the pin 16 and extending forwardly therefrom is a thrust bar 19 fitted on its forward end with a shovel or scoop 20. A link 21 is pivotally connected to the bar 19 adjacent the scoop 20 as at 22, and also to the crank 7 at its other end. Springs 23 are connected to the forward end of bar 19 as at 24 and to standards 4 as at 25 for the purpose hereinafter set forth.

The several parts of the structure described are so arranged and proportioned that when the crank 7 is in its uppermost position the shovel or scoop 20 is elevated above the surface of the ground, as at 20a, but as it travels downwardly the scoop is moved through the position shown in solid lines to its lowermost position indicated in dotted lines at 20b. At the close of its downward movement the crank moves upwardly again and the scoop is again moved upwardly to the position 20a and the cycle is completed.

Since the scoop is inclined downwardly and forwardly from the bar 19 and is thrust into, and lifted out of the ground while the tractor is moving forwardly, it follows that with each rotation of the crank 7 it will scoop up a given quantity of soil, forming the desired hole in the soil and deposit the removed soil on the surface beyond the hole.

Since the scoop 20 and the tractor are operated from the same drive shaft their movements are perfectly coordinated, and the speed at which the tractor is operated is immaterial. When it is desired to operate the tractor without operating the scoop the clutch 8 is disconnected and the scoop is held in an inoperative position by the springs 23.

Although but one specific embodiment of the invention has been herein illustrated and described, it will be understood that various alterations in the details of construction and mode of assembly and operation may be made without departing from the scope of the invention as indicated in the appended claim.

I claim:

In combination, a tractor having an upstanding supporting structure mounted thereon, a crank-shaft mounted on said structure adjacent and forwardly of the tractor seat and drivingly connected to the tractor drive shaft, lever supporting means mounted on the rear axle housing of the tractor and depending therefrom, a lever pivotally mounted on said means and extending forwardly therefrom, a scoop mounted on the forward end of the lever and disposed to be moved into and out of the soil, a link connecting the crank-shaft and lever to impart an oscillatory movement to said lever, a manually operable clutch inserted in the crank-shaft adjacent the tractor seat, spring means connecting the lever and upstanding supporting means to normally support the scoop in an inoperative position when the clutch is disengaged.

PHILIP H. ROWE.